United States Patent [19]

Phipps

[11] 4,201,534
[45] May 6, 1980

[54] FOAM EXTRUSION DIE ASSEMBLY

[75] Inventor: Arthur L. Phipps, Los Osos, Calif.

[73] Assignee: Condec Corporation, Old Greenwich, Conn.

[21] Appl. No.: 914,580

[22] Filed: Jun. 14, 1978

[51] Int. Cl.$^2$ .................... B29F 3/04; B29F 3/08; B29D 27/00

[52] U.S. Cl. .................... 425/461; 264/51; 264/177 R; 425/466; 425/817 C

[58] Field of Search .......... 425/461, 466, 817 C; 264/46.1, 51, 54, 177 R

[56] References Cited

U.S. PATENT DOCUMENTS

| | | | |
|---|---|---|---|
| 2,435,426 | 2/1948 | Davies | 425/461 |
| 3,074,106 | 1/1963 | Eberman | 425/461 |
| 3,085,289 | 4/1963 | Van Riper | 425/461 |
| 3,195,183 | 7/1965 | Phillips | 425/466 |
| 3,268,950 | 8/1966 | Rankin | 425/466 |
| 3,323,169 | 6/1967 | Vitellard | 425/466 X |
| 3,385,917 | 5/1968 | Breukink et al. | 264/51 |
| 3,407,441 | 10/1968 | Vigansky et al. | 425/461 |
| 3,525,125 | 8/1970 | Berger et al. | 264/51 X |
| 3,632,279 | 1/1972 | Christy et al. | 425/461 X |
| 3,850,568 | 11/1974 | Bartha et al. | 425/466 |
| 3,860,383 | 1/1975 | Sirevicius | 425/461 |
| 3,871,812 | 3/1975 | Phipps | 264/51 X |
| 3,874,981 | 4/1975 | Hayashi et al. | 264/46.1 X |
| 3,985,845 | 10/1976 | Akatsuka et al. | 425/466 X |
| 4,008,036 | 2/1977 | Verlinden et al. | 425/466 |
| 4,071,591 | 1/1978 | Kobayashi et al. | 264/54 X |
| 4,124,351 | 11/1978 | Garbuio | 425/466 X |
| 4,125,350 | 11/1978 | Brown | 425/466 X |

FOREIGN PATENT DOCUMENTS

| | | | |
|---|---|---|---|
| 451864 | 10/1948 | Canada | 264/53 |
| 291940 | 7/1965 | Netherlands | 264/51 |

*Primary Examiner*—Philip Anderson
*Attorney, Agent, or Firm*—Maky, Renner, Otto & Boisselle

[57] ABSTRACT

A foam extrusion die of the type including a main die body having a face and two spaced, adjustable die lip members having lips defining an elongated, arcuate die orifice through which extrudate moves both laterally and axially outwardly relative to the lip members. The die includes toe and heel clamp assemblies fastened to the die body for biasing the lip members against the face for continuous sealing line contact therebetween. Choker bars secured to the die body at opposite sides of the face define the ends of the die orifice. Provision is also made for specially fabricated heating or cooling passages in the lip members proximate the die orifice.

27 Claims, 5 Drawing Figures

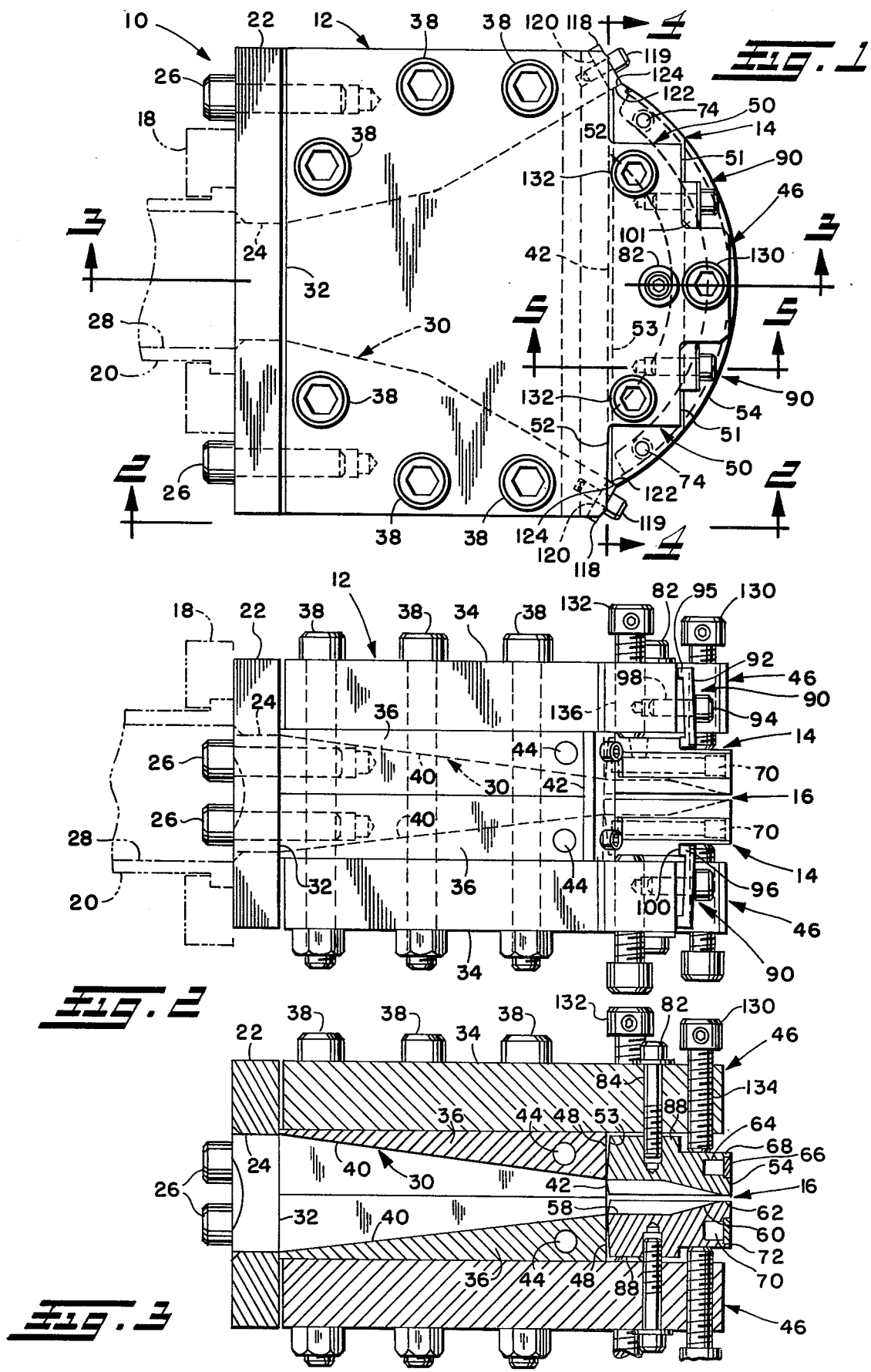

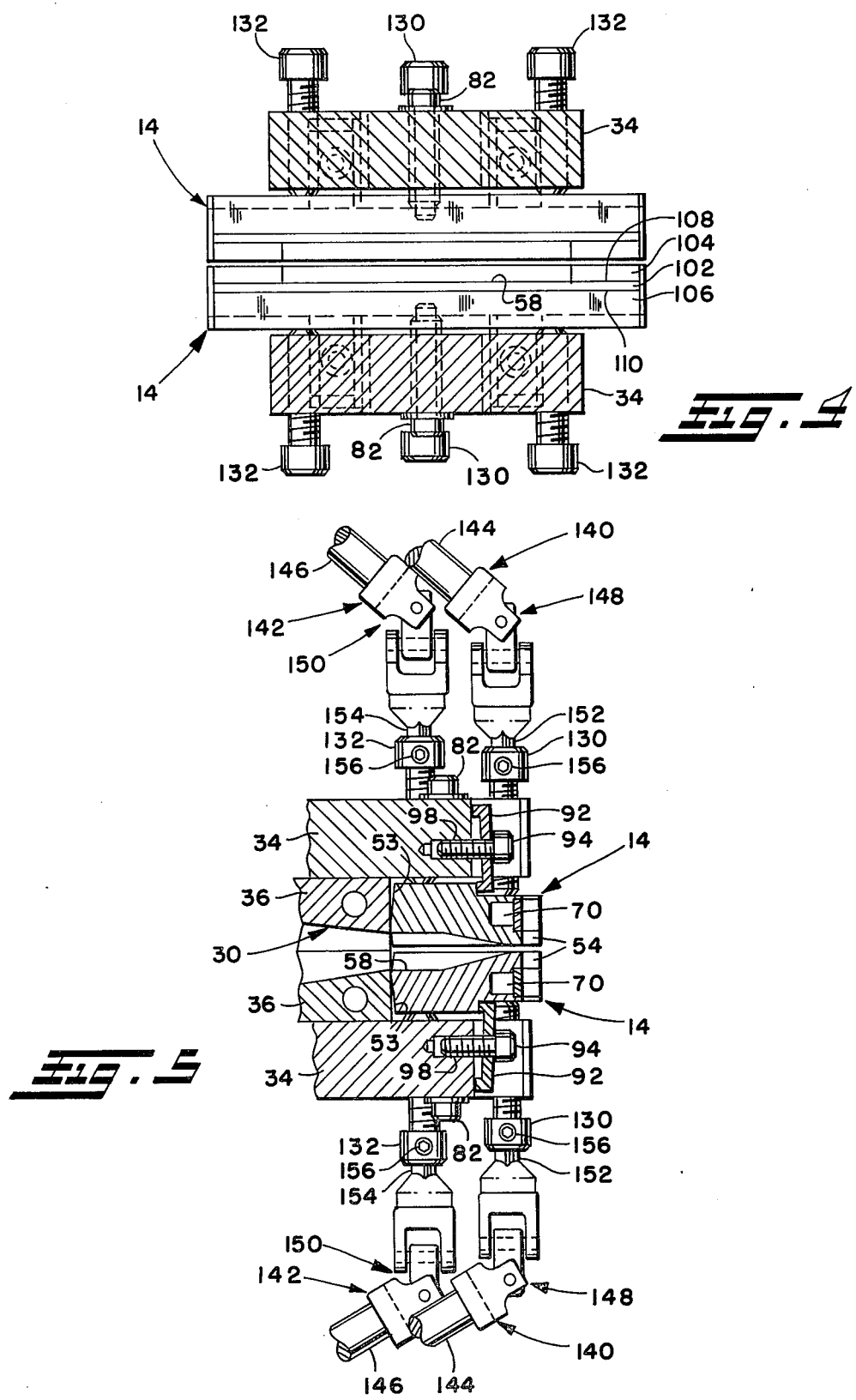

FOAM EXTRUSION DIE ASSEMBLY

BACKGROUND OF THE INVENTION

The present invention relates to an extrusion die assembly and more particularly to a foam extrusion die assembly of the type disclosed in applicant's U.S. Pat. No. 3,871,812, issued Mar. 18, 1975 and entitled "Foam Extrusion Die".

The design of foam extrusion dies for a profile extrusion line is largely an art, and because the extruded material generally assumes a cross-section different than that of the die orifices, selecting the exact die shape for a desired cross-section is largely a matter of trial and error.

Applicant in his above-noted patent disclosed a foam extrusion die assembly which facilitates obtaining the proper die orifice shape for a desired profile of the extruded product, e.g., foam boards, planks, and logs. Applicant therein provided a die body to which are fastened two spaced, adjustable die lip members having arcuate outer faces which extend axially outwardly from the face of the die body at the discharge end thereof and which together define an elongated, axially outwardly extending, arcuate die orifice through which foaming material moves both laterally and axially outwardly relative to the lip members. The ends of the orifice are each defined by an elongate key which is set in a key way at each side of the die body such that one end of the key is positioned between the lip members. The lip members are mounted on the body portion for slight movement by a plurality of fasteners extending through oversized bores both in the body and lip members and are manipulable such that the die orifice may be opened or closed at the center thereof to correct the shape of the same to obtain readily the desired profile of the extruded product.

Although such type of die assembly has been found to be an improvement over other known types of extrusion dies and die assemblies, no adequate provision is made for continuous positive sealing contact between the lip members and the face of the die body through which material may otherwise pass during operation, and thus may require frequent disassembly and cleaning of the die assembly. Moreover, no provision is made to ensure alignment of the lip members and to prevent lateral movement thereof during operation thus requiring time consuming and frequent adjustments of the lip members. In addition, the minimum die orifice opening at the throat thereof is limited in applicant's prior die assembly by a square key disposed therebetween which may also cause discontinuity in the distribution channel of the die which in turn may disturb and cause stagnation of the liquid flow in the die orifice thus giving the extruded product uneven edges. Also, no provision is made for fluid cooling or heating of the lip members adjacent the orifice during extrusion of material therethrough which oftentimes is critical to control positively the foaming and shaping of the foaming material.

SUMMARY OF THE INVENTION

Therefore, it is a principal object of the present invention to provide an extrusion die assembly of the type described which maintains a continuous seal between the lip members and the face of the die body to prevent the passage of material otherwise therethrough.

Another object of the invention is to provide such a die assembly wherein such sealing contact for each lip member is maintained by a heel and toe clamp assembly fastened to the die body which biases the lip member against the face of the die body.

Still another important object of the invention is to provide a die assembly of the type described having provision for maintaining the lip members aligned and for preventing lateral movement of the same during extrusion of material therethrough.

Yet another object of the invention is to provide such a die assembly wherein such vertical alignment is maintained by a pair of choker bars secured to the body at opposite sides thereof and contiguous with faces at the lateral extremities of the die lips, and which cooperate with the face of the die body to form a seat for the lip members.

A further important object of the invention is to provide a die assembly of the type described which is easier to adjust and has a greater latitude of adjustment.

Still a further important object of the invention is to provide a die assembly of the type described having provision for fluid cooling or heating of the lip members.

Yet a further object of the invention is to provide such a die assembly wherein the lip members each include a channel opening outwardly to the arcuate face thereof and extending substantially the width and length of the arcuate face, and a closure strip flush with the arcuate face closing the channel thereby to form a heating and cooling passage proximate the die orifice.

These and other objects and advantages of the invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In the annexed drawings:

FIG. 1 is a top view of an extrusion die assembly in accordance with the present invention;

FIG. 2 is a side elevation of the die asembly of FIG. 1 as viewed from the line 2—2 thereof;

FIG. 3 is a longitudinal vertical section through the die assembly of FIG. 1 taken along the longitudinal axis thereof (line 3—3 of FIG. 1);

FIG. 4 is a transverse vertical section of the die assembly of FIG. 1 taken along the line 4—4 thereof; and FIG. 5 is a fragmented longitudinal vertical section of the die assembly of FIG. 1 taken along the line 5—5 thereof and illustrating an arrangement for adjusting remotely the lip members of the die assembly.

DESCRIPTION OF THE PREFERRED EMBODIMENT

Referring now in detail to the drawings, a preferred form of extrusion die assembly in accordance with this invention is indicated generally by reference numeral 10 and comprises a main die body member 12 and a pair of adjustable die lip members 14 which are movably connected to the body member 12 at its discharge end and together define a die orifice 16 which may be varied in shape in a manner to be subsequently described. The die body 12 may be secured at its receiving end by coupling plate 18 to a supply source 20 for extrudate, such as to the discharge portion of a screw barrel of a conventional extruder. The extruder is not shown as its construction is well known to those skilled in the art. A suitable adapter plate 22 having material shaping passage 24 may be attached by suitable fasteners 26 to the die body 12 between the same and the source 20 for directing the flow material from the chamber 28 through flow shaping passage 24 into a longitudinally extending, flow shaping passage 30 in the die body 12 which, in the preferred form of the invention, is substantially square at its inlet 32.

The body portion 12 may be integrally formed as by casting the same, but preferably is fabricated as shown and comprises spaced retainer plates 34 between which are sandwiched compensator plates 36. The retainer and compensator plates are secured together at the sides thereof by two series of longitudinally spaced fasteners 38. The compensator plates include interfacing channels 40 having sloped bottoms and sides which together cooperate to define the flow shaping passage 30. The shaping passage 30 in the die body preferably is symmetrical along its longitudinal axis and progressively increases in width and decreases in height from its inlet 30 to its outlet 42 which is substantially rectangular in shape. It will be appreciated that the shaping passage 30 shapes the extrudate to a desired rectangular profile for discharging the same between the die lip members 14 mounted at the outlet 42. Moreover, the shaping passage 30 provides for a minimal amount of expansion of the extrudate therein because the cross-sectional area thereof is substantially the same along the length of the body portion 12.

If desired, the compensator plates 36 may include transversely extending bores 44 into which cartridge heaters or the like may be inserted whereby the material may be heated as it flows through passage 30.

The retainer plates 34 at the discharge end of the die body 12 have projecting ends 46 which extend beyond accurately machined end faces 48 of the compensator plates 36 which extend normal to the longitudinal axis of the die generally represented by section line 3—3 of FIG. 1. Both lateral sides 50 of the projecting ends 46 each include inner and outer stepped recesses 51 and 52, respectively, for a purpose to be subsequently described.

Mounted between and to the projecting ends 46 of the retainer plates 34 and extending outwardly from the end faces 48 of the compensator plates 36 are the lip members 14 which are substantially parallel to the longitudinal axis of the shaping passage 30 and are disposed adjacent and top and bottom the outlet 42. The lip members are substantially of like shape and are oppositely facing, and as viewed from the top (see FIG. 1), each has an arcuate outer face 54 and an accurately machined, chordal, inner face 53 adapted for sealing engagement with the faces 48 in a manner described below. Within each lip member at its innermost side, a palate-shape cavity 58 is provided with a smoothly sloping surface 60 from the bottom of the cavity to the perimeter of the die lip at its outer face 54 (see FIG. 3). At the intersection of the sloping surface and outer face is a die land or lip 62 which may be flattened to any desirable degree. The die land 62 of the lip members together define therebetween the top and bottom edges of the gap or die orifice 16. It will be seen that the ends of the orifice are defined by choker bars in a manner described below.

As best seen in FIG. 3, the lip members 14 each further include an arcuate channel 64 which opens outwardly to the arcuate outer face 54 and extends substantially the arcuate length thereof. An elongate, narrow, closure strip 66 is secured in recess 68 also along the arcuate length of the channel and flush with the outer face 54 to close the channel to form a passage 70 in the lip member. Seal weld 72 is provided to secure the closure strip in place and to seal against possible leakage between the same and lip member. Inlet and outlet openings 74 may also be provided communicating with opposite ends of the passage 70 through which a heating or cooling medium may be passed to heat or cool, respectively, the lip members during operation. It will be appreciated that the openings 74 are positioned adjacent the outer recesses 52 of the retainer plates 34 to permit coupling of flexible supply tubes or the like to the openings.

Each lip member 14 is fastened to the die body 12 by a centrally located clamp screw 82 which passes freely through a corresponding oversized hole 84 in the projecting end 46 of the adjacent retainer plate 34 and is received at its threaded end in a threaded bore 86 in the outermost side 88 of the lip member. The clamp screw is not fully tightened thereby permitting each lip to be moved slightly while still being restrained against the die body.

As best seen in FIGS. 1 and 2, a clamp assembly 90 located at each side 50 of the projecting ends 46 of the retainer plates 34 at the inner recesses 51 maintains the inner face 53 of each lip member in sealing contact with the face 48 of the corresponding compensator plate 36. Each clamp assembly includes a heel and toe plate 92 which is secured by fastener 94 extending through a bore in the plate intermediate the heel 95 and toe 96 thereof. The threaded end of the fastener is received in threaded bore 98 in the inner step 51 of the retainer plate. When the fastener 94 is tightened thus firmly urging the plate 92 rearwardly, the heel 95 is adapted to engage the inner step 51 and the toe 96 is adapted to engage a chordal shoulder 100 provided on the outermost side 88 of the lip member thus to bias the same toward the end face of the corresponding compensator plate for sealing contact therewith. It will be appreciated that the clamp assembly functions as a lever having a mechanical advantage greater than one with the heel serving as the fulcrum thereof. The inside rearwardly facing edge of each heel and toe clamp is relieved as seen at 101 to accommodate the slight radius at the inside corner of the step 51, such radius being provided at the inside corner of both steps.

The inner faces 53 of the lip members are accurately machined, and, as best seen in FIGS. 3–5, have a narrow flat 102 and sloping inner and outer transversely extending relief surfaces 104 and 106, respectively, which facilitate pivotal adjustment of the lip members while maintaining sealing line contact with the end face 48 at either of the line edges 108 or 110 of the flat. Accordingly, during adjustment of the lips in the below described manner, a pivot line seal is continuously maintained over the required adjustment range.

Again referring to FIGS. 1 and 2, the lip members 14 are maintained in alignment and restrained against lateral movement by lateral guides or choker bars 118 secured by suitable fasteners 119 to inclined shoulders 120 at opposite sides of the surfaces 48 of compensator plates 36. The choker bars 118 span the die orifice 16 thereby defining the ends thereof and are contiguous with the lip members 14 at their lateral extremities, and more specifically, at the intersections of the outer and inner faces 54 and 53 thereof. Preferably, the lip members at each such intersection are provided with a beveled face 122 which is normal to the inclined shoulder 120 such that the flat guide face 124 of the choker bar 118 flushly abuts thereagainst for contiguous sliding contact thereby permitting adjustment of the lip members while maintaining the same laterally fixed. It can thus be seen that the guide faces 124 of the choker bars and end faces 48 cooperatively act to form a seat for the lip members, and the latter are wedgingly urged into said seat by the clamping assemblies 90. Moreover, the guide faces 124 of the choker bars at each side of the die lips preferably are mounted so that the inner edge is at an included angle substantially equal the included angle between the vertical sides of the passage 30 and form a continuation thereof for smooth flow of material through the lip members and out the die orifice.

It will be appreciated that the choker bars which define the ends of the orifice also provide for greater latitude of movement of the die lips than previously could be obtained where the end defining element was disposed between the lip members in the die gap.

For adjusting the position of the lip members to vary the shape of the die orifice, there are provided for each lip member socket head adjusting screws 130 and 132. The adjusting screw 130 extends through a threaded bore 134 in the projecting end 46 of the retainer plate and engages the outermost side 88 of lip member 14 forwardly of the centrally located clamp screw 82. Adjusting screws 132 are positioned laterally and axially rearwardly of the clamp screw 82 and are similarly received in threaded bores 136 in the projecting end 46 of the retainer plate and engage the outermost side 88 of the lip members rearwardly and laterally of the clamp screw 82. The lip members, and thus the die orifice shape, may be adjusted as required by oppositely adjusting inwardly and outwardly the adjusting screws 130 and 132. The position of the screws 82 will limit the proximity of the lip and the pressure of the extrudate will separate the lips to the extent permitted by the screws 130 and 132.

As seen in FIG. 5, drive assemblies 140 and 142 may be connected to the adjusting screws 130 and 132, respectively, for remote adjustment of the same. The drive assemblies 140 and 142 include, respectively, rods 144 and 146, universal joint and socket combinations 148 and 150, and stub shafts 152 and 154, the latter being received in the sockets in the caps of the adjusting screws 130 and 132. The stub shafts are of the same transverse section as the sockets. Moreover, there may be provided pins or keys 156 to prevent disengagement of the socket assemblies from the adjusting screws. The socket assemblies provide for remote adjustment of the lip members by rotation of the rods 144 and 146. The remote adjustment is useful if the die is employed in a vacuum chamber or in a submerged or closed liquid or gas environment, thus avoiding the requirement of direct access for adjustment.

It can now be seen that the spaced lip members provide an axially outwardly extending die orifice which permits the extrudate to move laterally and axially outwardly therethrough thus facilitating expansion of the flow material in all directions simultaneously. Moreover, the die orifice opening can be adjusted by manipulating the lip members to obtain the desired profile of the extruded product. If a foam board, for example, is too thin or too thick in the center thereof, the die lips may be adjusted to close the gap more in the center than at the ends or to open the gap more in the center, respectively. Moreover, such adjustment may be made as flow material is being extruded thereby immediately correcting for desired dimensions.

The embodiments of the invention in which an exclusive property or privilege is claimed are defined as follows:

1. An extrusion die assembly comprising a body member, a pair of spaced lip members mounted on said body member each having a lip which together define an extrusion die orifice therebetween, and passage means for heating or cooling medium in at least one of said lip members extending along the lip to the lip in proximate relationship thereto, said passage means comprising in an outwardly opening channel in said one of said lip members and means to close said channel along the opening thereof thereby to define a passage.

2. An assembly as set forth in claim 1 wherein said one of said lip members has an outer face terminating at the lip thereof and said channel opens outwardly to said outer face.

3. An assembly as set forth in claim 2 wherein said outer face is arcuate and said channel is arcuate.

4. An assembly as set forth in claim 3 wherein said means to close said channel comprises a closure strip extending substantially the length of said channel.

5. An assembly as set forth in claim 4 further comprising seal weld means securing said strip to said one of said lip members at said outer face.

6. An assembly as set forth in claim 5 wherein said strip has an outer surface substantially flush with said outer face of said one of said lip members.

7. An assembly as set forth in claim 1 comprising inlet and outlet means in said one of said lip members communicating with said passage means.

8. An assembly as set forth in claim 7 wherein said body member includes a pair of spaced projections having sides and said lip members are mounted between such projections and restrained thereagainst, the sides of at least one of said projections having recesses adjacent said inlet and outlet means to provide access thereto.

9. An extrusion die assembly comprising a die body having a die body face and extrudate passage means in said body terminating at an opening in said face, a pair of spaced lip members extending outwardly from said die body face at opposite sides of said opening and together defining a die orifice, means to fasten said lip members to said die body for relative pivotal movement, and means to bias said lip members against said die body face for sealing line engagement therewith during such relative pivotal movement whereby a pivot line seal between each lip member and said die body is maintained during pivotal adjustment of said lip members.

10. An assembly as set forth in claim 9 wherein said means to bias comprises clamping means.

11. An assembly as set forth in claim 10 wherein said clamping means comprises a heel and toe plate and means to urge said heel and toe plate towards said die body with the heel thereof engaging said die body and the toe thereof engaging said lip member.

12. An assembly as set forth in claim 11 wherein each said lip member has an arcuate outer face and a chordal shoulder, and said toe engages said chordal shoulder.

13. An assembly as set forth in claim 11 wherein said means to urge comprises a fastener extending through an opening in said heel and toe plate intermediate the heel and toe thereof and received in a threaded bore in said die body.

14. An assembly as set forth in claim 11 wherein said die body includes spaced projections extending outwardly from said die body face and said lip members are fastened to said projections.

15. An assembly as set forth in claim 14 wherein said projections each have opposed stepped sides and said heel of said heel and toe plate presses against one of the steps thereof.

16. An assembly as set forth in claim 15 wherein there are two said heel and toe plates for each lip member located at opposite sides of said projections.

17. An assembly as set forth in claim 14 further comprising means to adjust said lip members to vary the shape of said die orifice.

18. An assembly as set forth in claim 9 wherein said lip members contact said die body face along a pivot seal line.

19. An assembly as set forth in claim 17 wherein said lip members each have an inner face and said inner face is relieved for line contact with said die body face.

20. An assembly as set forth in claim 9 wherein said lip members each include passage means for heating or cooling medium.

21. An assembly as set forth in claim 20 wherein said lip members each have an arcuate outer face terminating at said lip thereof and said passage means includes a channel in each said lip member opening outwardly to said arcuate outer face and means to close said channel at said outer face thereby to define a passage.

22. An assembly as set forth in claim 9 further comprising guide means at opposite sides of said die body face laterally to fix said lip members.

23. A die assembly comprising a die body having a die body face, a pair of adjustable lip members fastened for relative movement to said die body and extending outwardly from said die body face, said lip members having opposed lips defining an elongate gap through which material can be extruded, said die body including at each side of said die body face outwardly projecting guide faces, said lip members having at their lateral extremities opposed faces in mating contact with said guide faces thereby laterally to fix said lip members.

24. An assembly as set forth in claim 23 wherein said guide and opposed faces are commonly inclined.

25. An assembly as set forth in claim 24 wherein each said lip member has an arcuate outer face and a chordal inner face, and said outer and inner faces commonly terminate at said inclined opposed faces.

26. An assembly as set forth in claim 25 wherein said die body has inclined shoulders at each side thereof and a choker bar secured to said die body at each said shoulder, said choker bar having one side thereof forming said inclined guide face.

27. An assembly as set forth in claim 23 further comprising clamping means for biasing said lip members against said die body face.

* * * * *